United States Patent
Lu et al.

(10) Patent No.: US 11,335,902 B1
(45) Date of Patent: May 17, 2022

(54) POLYMER BLENDS HAVING MIXED ELECTRONIC AND IONIC CONDUCTIVE PROPERTIES

(71) Applicant: Ford Global Technologies, LLC, Dearborn, MI (US)

(72) Inventors: Zijie Lu, Novi, MI (US); Venkataramani Anandan, Farmington Hills, MI (US); Bryan William Boudouris, West Lafayette, IN (US); Siddhartha Akkiraju, Fremont, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/136,900

(22) Filed: Dec. 29, 2020

(51) Int. Cl.
| | |
|---|---|
| *H01M 4/00* | (2006.01) |
| *H01B 1/00* | (2006.01) |
| *H01M 4/36* | (2006.01) |
| *H01M 4/60* | (2006.01) |
| *H01M 10/0525* | (2010.01) |
| *H01M 10/0565* | (2010.01) |
| *H01B 1/12* | (2006.01) |
| *H01M 4/02* | (2006.01) |

(52) U.S. Cl.
CPC ............ *H01M 4/364* (2013.01); *H01B 1/122* (2013.01); *H01M 4/602* (2013.01); *H01M 10/0525* (2013.01); *H01M 10/0565* (2013.01); *H01M 2004/021* (2013.01); *H01M 2004/028* (2013.01); *H01M 2300/0082* (2013.01); *H01M 2300/0091* (2013.01)

(58) Field of Classification Search
CPC ........ H01B 1/00; H01B 1/1222; H01B 1/124; H01B 1/20; H01B 1/122; H01B 1/12; H01M 4/364; H01M 4/602; H01M 4/622; H01M 4/667
See application file for complete search history.

(56) References Cited

U.S. PATENT DOCUMENTS

| | | | |
|---|---|---|---|
| 8,445,140 B2 | 5/2013 | Bertin et al. | |
| 9,985,313 B2 | 5/2018 | Strand et al. | |
| 10,424,810 B2 | 9/2019 | Pan et al. | |
| 10,497,968 B2 | 12/2019 | Zhamu et al. | |
| 11,069,920 B2 * | 7/2021 | Anandan | H01M 4/62 |

(Continued)

FOREIGN PATENT DOCUMENTS

KR    20140014218 A    2/2014

OTHER PUBLICATIONS

Yamada et al. "Phase structure and electrical and mechanical properties of PLLA/ionic conductive polyether blends prepared by melt mixing", Polymer Journal (2019) 51:649-656.*

(Continued)

*Primary Examiner* — Mark Kopec
(74) *Attorney, Agent, or Firm* — Dave Kelley; Brooks Kushman P.C.

(57) ABSTRACT

A battery electrode material includes a composition of (A) a charge-conducting radical polymer, (B) poly[poly(ethylene oxide) methyl ether methacrylate] (PPEGMA); and (A) a lithium salt, the composition being a mixed ionic and electronic conductor with ionic conductivity at room temperature of at least about $10^{-4}$ S/cm and electronic conductivity of at least about $10^{-3}$ S/cm.

18 Claims, 4 Drawing Sheets

(56) References Cited

U.S. PATENT DOCUMENTS

| | | |
|---|---|---|
| 2010/0221614 A1* | 9/2010 | Bertin .............. H01M 10/0565 429/309 |
| 2019/0131660 A1 | 5/2019 | Anandan et al. |
| 2019/0144600 A1* | 5/2019 | Yadav ................. H01M 4/8668 525/410 |
| 2019/0173082 A1 | 6/2019 | Zhamu et al. |
| 2020/0032015 A1 | 1/2020 | Boudouris et al. |
| 2020/0112050 A1 | 4/2020 | Hu et al. |
| 2020/0350589 A1* | 11/2020 | Jang ..................... H01M 4/625 |

OTHER PUBLICATIONS

Organic/Inorganic Hybrid Block Copolymer Electrolytes with Nanoscale Ion-Conducting Channels for Lithium Ion Batteries, Macromolecules 2012, 45, 9347-9356.*

Fu et al. "Enhanced Cyclability of Lithium-Sulfur Batteries by a Polymer Acid-Doped Polypyrrole Mixed Ionic-Electronic Conductor", Chem. Mater. 2012, 24, 3081-3087.*

Gunday et al. "An investigation of lithium ion conductivity of copolymers based on P(AMPS-co-PEGMA)", J. Appl. Polym. Sci. 2019, DOI: 10.1002/APP.47798.*

* cited by examiner

POLYMER BLENDS HAVING MIXED ELECTRONIC AND IONIC CONDUCTIVE PROPERTIES

TECHNICAL FIELD

The disclosure relates to materials having both electronic and ionic conduction, devices using the materials, and methods of producing the materials.

BACKGROUND

With the ongoing development and use of electronic devices for an increasing number of applications, there has been a growing demand for batteries. Various types of batteries have been introduced, with a focus being on improving their safety, performance, and longevity. Because many of the applications require rechargeable, lightweight, and powerful batteries, a need developed for high-performing materials which may meet the demands of a wide array of battery applications. Among the materials have been those which may serve a dual purpose of ionic and electronic conduction.

SUMMARY

In at least one embodiment, a battery electrode material is disclosed. The material includes a composition of (A) a charge-conducting radical polymer, (B) poly[poly(ethylene oxide) methyl ether methacrylate] (PPEGMA), and (C) a lithium salt. The composition is a mixed ionic and electronic conductor. The composition may have ionic conductivity at room temperature of at least about $10^{-4}$ S/cm. The composition may have electronic conductivity at room temperature of at least about $10^{-3}$ S/cm. The charge-conducting radical polymer may be poly(4-glycidyloxy-2,2,6,6-tetramethylpiperidine-1-oxyl) (PTEO). A ratio of [Li$^+$]:[O] in the composition may be about 0.2 to 0.9. A mass ratio of (A):(B) may be from about 1:1 to about 1:4. (A) may form a matrix supporting a plurality of islands including (B) and (C). The composition may be included in a solid state battery. The composition may form a cathode.

In one or more embodiments, an electron- and ion-conducting material is disclosed. The material includes a matrix including (A) an electron charge-conducting radical polymer and a plurality of islands embedded in the matrix, the plurality of islands including (B) a lithium ion-conducting polymer and (C) one or more salts. The matrix and plurality of islands may be a mixed electronic and ionic conductor. The conductor may have ionic conductivity at room temperature of at least about $10^{-4}$ S/cm. The conductor may have electronic conductivity at room temperature of at least about $10^{-3}$ S/cm. A mass ratio of (A):(B) may be from about 1:1 to about 1:4. The electron charge-conducting radical polymer may be poly(4-glycidyloxy-2,2,6,6-tetramethylpiperidine-1-oxyl) (PTEO). The lithium ion-conducting polymer may be poly[poly(ethylene oxide) methyl ether methacrylate] (PPEGMA), poly(ethylene oxide) (PEO), or both. A ratio of [Li$^+$]:[O] in the conductor may be about 0.1 to 0.12. (C) may be a mixture of lithium salts. (A) and (B) may be bound by covalent bonds. A sensor including the material is disclosed. An electronic device including the material is disclosed.

In an alternative embodiment, a method of forming an ion-and-electron conductive material is disclosed. The method may include direct blending individually synthesized component (A) including an electron charge-conducting radical polymer with a mixture of component (B) including a lithium ion-conducting polymer and component (C) including a lithium salt to form a polymer blend solution. The polymer blend solution may have a [Li$^+$]:[O] ratio of about 0.1 to 0.12. The method may further include casting and drying the polymer blend solution to form the ion-and-electron conductive material such that a matrix of the component (A) supports a plurality of islands of the components (B) and (C). The method may also include forming a thin film from the ion-and-electron conductive material having a thickness of about 50 nm to 5 µm. The component (A) may include poly(4-glycidyloxy-2,2,6,6-tetramethylpiperidine-1-oxyl) (PTEO). The component (B) may include poly[poly(ethylene oxide) methyl ether methacrylate] (PPEGMA), poly(ethylene oxide) (PEO), or both.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present disclosure. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Except in the examples, or where otherwise expressly indicated, all numerical quantities in this description indicating amounts of material or conditions of reaction and/or use are to be understood as modified by the word "about" in describing the broadest scope of the disclosure.

The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

It must also be noted that, as used in the specification and the appended claims, the singular form "a," "an," and "the" comprise plural referents unless the context clearly indicates otherwise. For example, reference to a component in the singular is intended to comprise a plurality of components.

As used herein, the term "substantially," "generally," or "about" means that the amount or value in question may be the specific value designated or some other value in its neighborhood. Generally, the term "about" denoting a certain value is intended to denote a range within +/−5% of the value. As one example, the phrase "about 100" denotes a range of 100+/−5, i.e. the range from 95 to 105. Generally, when the term "about" is used, it can be expected that similar results or effects according to the disclosure can be obtained within a range of +1-5% of the indicated value. The term "substantially" may modify a value or relative characteristic disclosed or claimed in the present disclosure. In such instances, "substantially" may signify that the value or relative characteristic it modifies is within ±0%, 0.1%, 0.5%, 1%, 2%, 3%, 4%, 5% or 10% of the value or relative characteristic.

It should also be appreciated that integer ranges explicitly include all intervening integers. For example, the integer range 1-10 explicitly includes 1, 2, 3, 4, 5, 6, 7, 8, 9, and 10. Similarly, the range 1 to 100 includes 1, 2, 3, 4, . . . 97, 98, 99, 100. Similarly, when any range is called for, intervening numbers that are increments of the difference between the upper limit and the lower limit divided by 10 can be taken as alternative upper or lower limits. For example, if the range is 1.1. to 2.1 the following numbers 1.2, 1.3, 1.4, 1.5, 1.6, 1.7, 1.8, 1.9, and 2.0 can be selected as lower or upper limits. Any two numbers, of a set of numbers, may form an integer range. For example, if the disclosed numbers are 1, 2, 3, 4, 5, the range the numbers cover may be 1 to 5, 1 to 3, 2 to 4, 3 to 4, among other options.

As used herein, the term "and/or" means that either all or only one of the elements of said group may be present. For example, "A and/or B" means "only A, or only B, or both A and B". In the case of "only A", the term also covers the possibility that B is absent, i.e. "only A, but not B".

It is also to be understood that this disclosure is not limited to the specific embodiments and methods described below, as specific components and/or conditions may, of course, vary. Furthermore, the terminology used herein is used only for the purpose of describing particular embodiments of the present disclosure and is not intended to be limiting in any way.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

With respect to the terms "comprising," "consisting of," and "consisting essentially of," where one of these three terms is used herein, the presently disclosed and claimed subject matter can include the use of either of the other two terms.

The term "one or more" means "at least one" and the term "at least one" means "one or more." The terms "one or more" and "at least one" include "plurality" as a subset.

Development of new types of batteries has focused on increasing their conducting properties, safety, and weight reduction. Even an incremental improvement in any of these areas may provide an advantage with respect to the battery powered devices. One approach has focused on development of new materials capable of improving at least some of the desirable properties such as capacity or energy density.

Among the new materials, development has been noted in the area of materials which are capable of fulfilling more than one role or function. Typically, lithium ion battery electrodes contain a polymeric binder for structural integrity and carbon or another electrically conductive material for electrical conduction. Yet, the combination of the binder and the electrical conductor may take up to about 3-20 wt. % of the total electrode mass, thus reducing battery energy density. For the all-solid-state battery (ASSB), which is widely regarded as the next generation battery technology for electric vehicles and high-power devices, the non-active materials, including binder, electrically conductive material, and ionic conductive material, may even add up to 50-60 wt. % of the total electrode mass, thus impeding the wide adoption of the ASSBs. Reducing the conductor and binder volume and mass may result in increased energy density and overall cost reduction.

Several materials which are capable of electron and ion conduction at the same time have been identified. The materials, also called mixed conductors, may be classified based on their macromolecular structures as follows: homopolymers, block polymers, and polymer blends. While homopolymers have been shown to have good electronic conduction, their ionic conductivity is typically not satisfactory due to their non-polar backbones. Attempts to increase the homopolymer ionic conductivity have shown limited success as the modification also influences aggregation, crystallization, and transport behavior. Unlike homopolymers, which by definition do not have separate phases for electronic and ionic conduction, block copolymers have been shown to have a better balance of ionic and electronic conduction. But the conjugated block polymers, which have a single macromolecule having two or more distinct segments, are typically produced by complicated and challenging synthesis. Production of the block polymers is thus typically not practicable.

Therefore, polymer blends have emerged as the most promising group of mixed conductor materials. Among the group, a polymer blend system of poly(3,4-ethylene dioxythiophene) doped with poly(styrene sulfonate) (PEDOT:PSS) has become the most popular material. But the PEDOT:PSS system presents a number of disadvantages. For example, because the electronic conductivity of the material depends on charge mobility and charge carrier density, the electronic conductivity has been increased by tuning or doping the amount of PSS in the blend. The doping has been shown to result in unstable performance and decreased material and device stability. Additionally, ionic conductivity of the system is not ideal.

Thus, there is a need to develop a material having (a) good ionic and electronic conductivity at the same time, (b) capability to also serve as a binder, (c) economical and feasible synthesis, and (d) ability to be used in a variety of batteries and devices.

In one or more embodiments, a material having simultaneous ionic and electronic conductivity is disclosed. The material may include, comprise, consist of, or essentially consist of a blend including substantially or generally the following components:

(A) a charge-conducting radical polymer;
(B) lithium ion-conducting polymer; and
(C) one or more lithium salts.

The component (A) may include one or more radical polymers having a high electronic conductivity. The component (A) may include one radical polymer, at least one radical polymer, or a mixture of radical polymers. The component (A) may be an electron charge-conducting radical polymer. The high electronic conductivity may relate to electronic conductivity of >about $10^{-3}$ S/cm. A radical polymer of the component (A) may include an aliphatic backbone with open-shell pendant sites. Radical polymers conduct charge through a series of oxidation-reduction (redox) reactions between the open-shell pendant (or oxidation reduction) sites. The component (A) may include poly(4-glycidyloxy-2,2,6,6-tetramethylpiperidine-1-oxyl) (PTEO). PTEO includes open-shell sites (i.e., radical groups) on the pendant positions of the macromolecular chain. PTEO has electrical conductivities of >about 20 S/m. The poly(ethylene oxide)-like (PEO-like) backbone and amorphous nature of PTEO translates into its ability to conduct ions as well as electrons. The component (A) may include only PTEO or PTEO and at least one additional polymer.

The component (B) may include one or more ion conducting polymers. The component (B) may include one or at least one ion conducting polymer or a mixture of ion conducting polymers. The component (B) may include poly [poly(ethylene oxide) methyl ether methacrylate] (PPEGMA), PEO, or a mixture of both. PPEGMA has amorphous nature and relatively low glass transition temperature ($T_g$) of the methacrylate-based polymer ($T_g=-57°$ C.). At temperatures above $T_g$, the average segmental motion of the polymer chains increases which results in higher ionic conductivity than when the polymer matrix is in the glassy state due to the coupled nature of the polymer chain and lithium ions. The ethylene oxide (EO) groups in PPEGMA appear on the side chain of PPEGMA which prevents EO units from crystallizing. PPEGMA may have ionic conductivity of about $10^{-3}$ S/cm at elevated temperature of about 40 or 60° C. PEO includes EO units forming its backbone. PEO may be crystalline or partially amorphous. The component (B) may include only PPEGMA or PPEGMA and at least one additional polymer.

The component (C) may include at least one, one, or one or more lithium salts. The salts may be salts typical for polymer electrolyte systems, Li-ion batteries, or both. The component (C) may include lithium hexafluorophosphate (LiPF$_6$), lithium bis(trifluoromethanesulfonyl)imide (LiTFSI), lithium perchlorate (LiClO4), lithium hexafluoroarsenate (LiAsF6), lithium trifluoromethanesulfonate (LiTf), lithium tetrafluoroborate (LiBF4), the like, or a combination thereof.

The ratio of component (A):(B) or (B):(A) may be about, at least about, or at most about 1:1, 1:2, 1:3, 1:4, 1:5, or greater. The components (A) and (B) may be combined at about, at least about, or at most about equal mass.

The salt may be added in an amount of [Li$^+$]:[O] ratio of about, at least about, or at most about 0.1 to 0.12, 0.2 to 0.9, or 0.5 to 0.8. The salt may be added in an amount of [Li$^+$]:[O] ratio of about, at least about, or at most about 0.1, 0.2, 0.3, 0.4, 0.5, 0.6, 0.7, 0.8, 0.9, 0.10, 0.11, or 0.12. At ratios higher than about 0.8 to 0.12, the salt may negatively impact the polymer blend film quality, causing defects within the film, interfering with the charge transport redox reactions in the component (A) domains, the like, or a combination thereof.

The material disclosed herein may have substantially or generally high ionic and electronic conductivity in the temperatures of about −30 to 150, −20 to 100, or −10 to 80° C. The material may have substantially or generally high ionic and electronic conductivity in the temperatures of about −30, −29, −28, −27, −26, −25, −24, −23, −22, −21, −20, −19, −18, −17, −16, −15, −14, −13, −12, −11, −10, −9, −8, −7, −6, −5, −4, −3, −2, −1, 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, or 150° C., or any range naming any of the two numerals recited herein.

The substantially or generally high ionic conductivity relates to about, at most about, or at least about $10^{-5}$ to $10^{-2}$, $5\times10^{-4}$ to $5\times10^{-2}$, or $10^{-4}$ to $10^{-3}$ S/cm. The substantially or generally high ionic conductivity relates to about, at most about, or at least about $10^{-5}$, $5\times10^{-4}$, $10^{-4}$, $5\times10^{-3}$, $10^{-3}$, $5\times10^{-2}$, or $10^{-2}$ S/cm, or any range between any two numerals recited herein.

The substantially or generally high electronic conductivity relates to about, at most about, or at least about $10^{-5}$ to 10, $10^{-4}$ to 1, or $10^{-3}$ to $10^{-1}$ S/cm. The substantially or generally high electronic conductivity relates to about, at most about, or at least about $10^{-5}$, $5\times10^{-4}$, $10^{-4}$, $5\times10^{-3}$, $10^{-3}$, $5\times10^{-2}$, $10^{-2}$, $5\times10^{-1}$, $10^{-1}$, 1, 5, or 10 S/cm, or any range between any two numerals recited herein.

The material may have a room temperature (about 15 to 30° C.) ionic conductivity of about, at least about, or at most about $10^{-5}$ to $10^{-3}$ or $5\times10^{-4}$ to $5\times10^{-3}$ S/cm, or any range between any two numerals recited herein, and electronic conductivity of about, at least about, or at most about $10^{-3}$ to 1, $5\times10^{-2}$ to 0.5, or 0.01 to 0.1 S/cm, or any range between any two numerals recited herein. The material may have ionic conductivity of about 1 to 10, 2 to 8, or 4 to 6 mS/cm at 80° C., 0.05 to 0.5, 0.75 to 0.25, or 0.1 to 0.2 mS/cm at 30° C., or both.

Figure 1A:
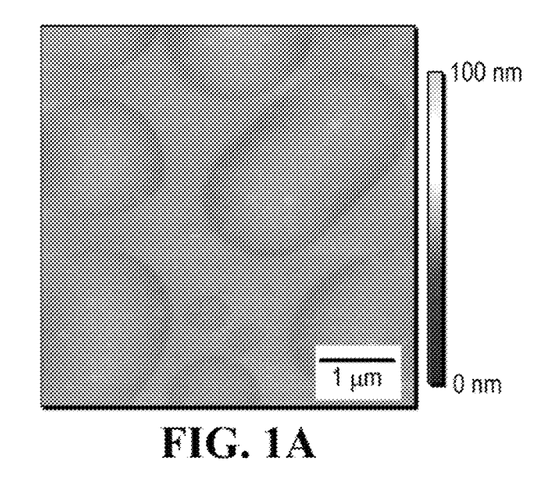
FIGS. 1A-1D are atomic force microscopy (AFM) images depicting distinct domains of electronic and ionic conductivity of the neat films of the blend of the component (A) and component (B) disclosed herein.
Figure 1B:
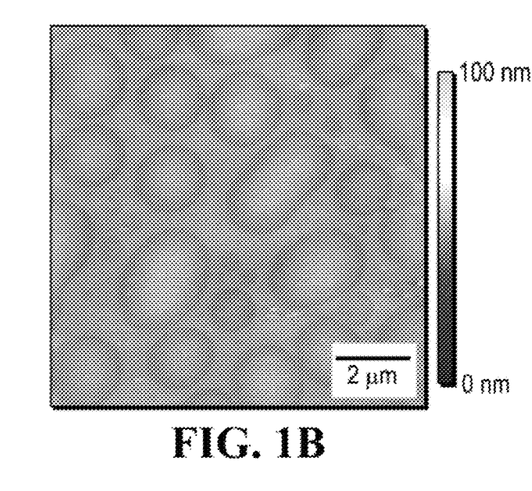

The material may have distinct domains of electronic and ionic conductivity via phase separation of component (A) and component (B), as can be seen in FIGS. 1A-1D. The images are atomic force microscopy images, which were taken using a Veeco Dimension 3100 AFM in the tapping mode. FIGS. 1A-1D are images of a thin film of the polymer blend including the component (A) and component (B) without the presence of salt of component (C). As can be seen, the film is of uniform thickness with the outline of the domains being tracked. FIGS. 1A and 1B are height images of the films formed from the material disclosed herein at different magnifications. The AFM height measurements show uniform thickness.

Figure 1C:
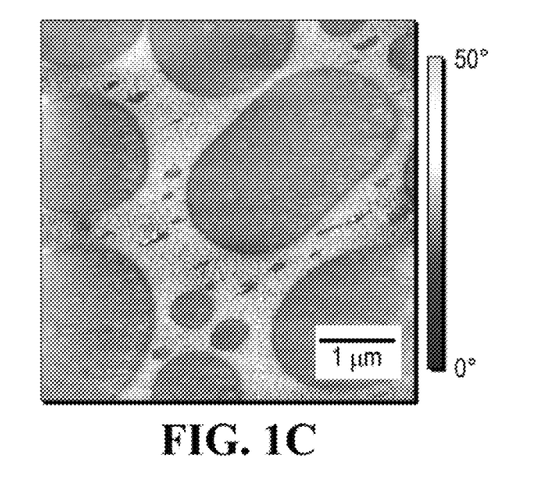
Figure 1D:
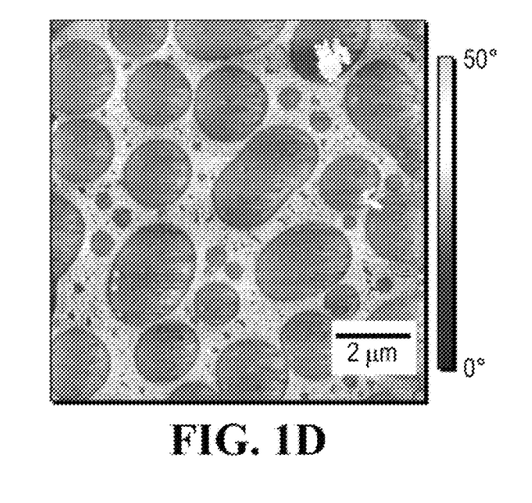

FIGS. 1C and 1D are phase images of the films at the corresponding magnifications. The images show a more evident distinctness of the domains at the phase shift of PTEO, represented by the lighter color, and the PPEGMA domains, which appear darker in color in FIGS. 1C and 1D. The images show domain formation of varying sizes.

The material may include a matrix of component (A). The material may include component (B) or the combination of components (B) and (C) embedded in the matrix. The component (B) is shown in FIGS. 1A-1D as islands, circles, blobs, or globules. The plurality of islands may have different sizes, shapes, configurations, or a combination thereof. The matrix is depicted as a platform or base carrying the islands. The islands may be embedded in the matrix. The components (A) and (B) may be coupled via covalent bonds.

Without limiting the disclosure to a single theory, it is presumed that because of the isolated domains of the component (B) that are much larger than the macromolecular scale, the segmental motion of the component (B) is not impacted by the inclusion of the component (A).

Figure 2:
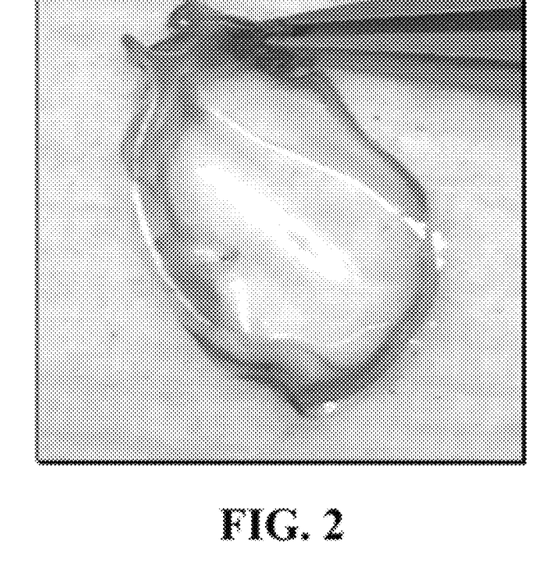
FIG. 2 is a photograph of a thin film of the polymer blend disclosed in one or more embodiments.

The material may form a film, layer, membrane, or sheet, which may be thin such as having several tens of nanometers to several millimeters. The material may form a film, layer, membrane, or sheet, which may be thin such as having about, at least about, or at most about 50 nm to 100 mm, 35 nm to 50 mm, or 20 nm to 10 mm. The film may have a thickness of about, at least about, or at most about 5 to 50, 2.5 to 25, or 1 to 10 µm. A non-limiting example of material forming a film is shown in the photograph of FIG. 2. The film of FIG. 2 includes a blend of PPEGMA, PTEO, and LiPF$_6$. The film may be transparent and/or translucent.

The material may be used to form one or more portions of a battery. For example, the material may form one or more portions of an electrode. The material may form a cathode, anode, or both. The material may function as a mixed (or simultaneous) ion conductor and electron conductor. Part of the material, e.g. PPEGMA plus Li-salts, may form a polymer electrolyte membrane as the separator. Alternatively, or in addition, the material may be used as a binder to provide structural support.

Various uses of the material have been identified including, but not limited to, a material for solid state batteries, all solid state batteries, lithium ion batteries, hybrid system batteries with a liquid electrolyte and solid electrodes, fuel cells, supercapacitors, sensors, organic electrochemical transistors, electronic devices, and the like.

Figure 3:
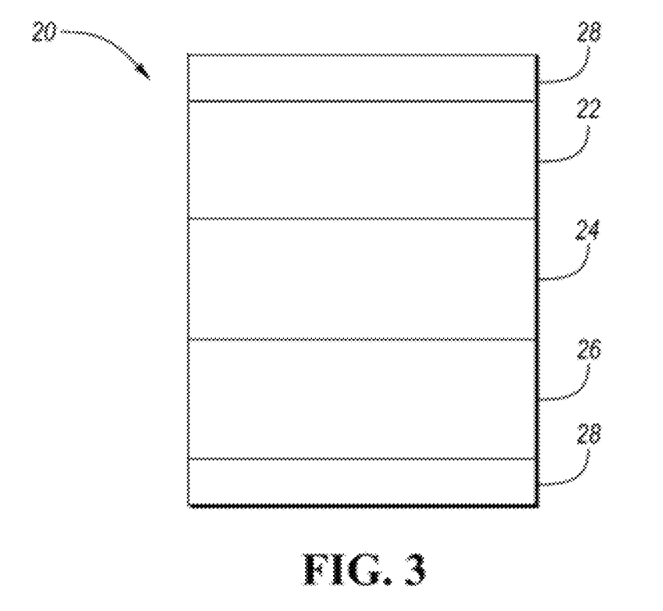
FIG. 3 is a schematic image of a non-limiting example of a battery using the polymer blend material disclosed herein.

In a non-limiting example, a battery 20 is disclosed. The battery 20 may include an anode 22, separator 24, cathode 26, and current collectors 28. A schematic depiction of the battery 20 is shown in FIG. 3. The battery's anode 22 may include a variety of materials, including, but not limited to, lithium metal, silicon oxide, graphite, a combination of graphite and silicon, pure silicon, LTO, lithium-metal alloys, tin, or any anode material that is being used for lithium ion batteries. The battery's separator 24 may include an oxide-based, sulfite-based, or solid polymer electrolyte, a mixture of PPEGMA and Li-salt, a mixture of PEO and salt, or another material. Electrolyte used in the separator may be only an ionic conductor. The cathode may include the material disclosed herein. The cathode material may be any material that is being used for lithium ion battery cathode and may include commercial intercalation materials such as lithium cobalt oxide (LCO), lithium nickel cobalt manganese oxide (NCM), lithium nickel cobalt aluminum oxide (NCA), lithium iron phosphate (LFP) and their derivatives, conversion-type materials such as chalcogenides (S, Se, Te), metal halides (F, Cl, Br, I), or oxygen or air, the like, or a combination thereof. The battery may be any type of battery named above.

In one or more embodiments, a method of making the material is disclosed. The method includes a solution-based synthesis. The method may include synthesizing components (A) and (B) separately by conventional methods. The method may include synthesizing the polymers from their monomers. After the polymers of components (A) and (B) are prepared, the method may include blending the polymers. The blending may be direct blending or direct mixing. Component (C) may be added to a solution of component (A) to form a first polymer salt solution. Component (C) may be added to a solution of component (B) to form a second polymer salt solution. The method may include adding component (C) only to component (A). The method may include dissolving a desirable amount of the first salt polymer and component (B) or desirable amount of the second salt polymer to form a solution. The method may include adding additional amount of component (C) to form a salt-containing polymer blend solution. The method may include forming one or more layers of desirable thicknesses from the solution by molding or casting. The solution may be molded or casted by depositing the solution into a mold, keeping the solution in vacuum for a time period until no solvent remains. The formed layer may be then removed from the mold. The method may be compatible with roll coating processes.

The method may include forming one or more battery components from the polymer blend. The method may include forming a cathode from the polymer blend material.

In a non-limiting example, a non-limiting example of a synthesis of the component (A), in this non-limiting example PTEO, may include synthesizing the monomer of the component (A), for example TEO. The method may include adding epichlorohydrin and TBAHS to an aqueous NaOH solution and stirring the mixture. The method may include adding a solution of TEMPO-OH in tetrahydrofuran to the mixture in a dropwise manner. The resulting solution may be subsequently vigorously stirred for 12 hours at room temperature and poured into ice water. The reaction mixture may be extracted with ethyl acetate. The method may include washing the organic layer with deionized water and extracting with ethyl acetate again. The combined organic layers may be then dried over anhydrous magnesium sulfate. The crude monomer product may be then obtained after removing the solvent by rotary evaporation. The monomer may be purified by column chromatography using a silica gel column with hexanes and ethyl acetate as the mobile phase.

Subsequently, the method may include synthesizing PTEO by combining a mixture of TEO and potassium tert-butoxide in a glass tube inside a glove box. The reaction may be sealed and taken from the glovebox. The reaction may be heated at about 80° C. for about 2 hours. After cooling to room temperature, dichloromethane may be added to the reaction mixture, and the organic phase may be washed with water. The polymer may be then precipitated in hexanes.

The method may include synthesizing component (B), in this non-limiting example PPEGMA, by preparing an EBIB solution with toluene, followed by adding the solution to a reaction vessel containing toluene, PEGMA, and copper chloride. The method may include adding HMTETA while purging with argon. The reaction is then sealed and allowed to proceed for about 24 hours at about 60° C. The reaction mixture may be then cooled, dichloromethane may be added, and the resulting organic solution may be passed through a neutral aluminum oxide column. The method may then include precipitating the polymer in hexanes.

The method may include blending PTEO and PPEGMA. PPEGMA may be dissolved in dimethyl carbonate to create a solution to which salt(s) of component (C) may be added in a desirable ratio to form a first polymer salt solution. The method may include dissolving PTEO in dimethyl carbonate to create a solution to which salt(s) of component (C) may be added in a desirable ratio to form a second polymer salt solution. Alternatively, component (C) may be added only to PPEGMA while PTEO is kept neat without any salt.

A mass of the first polymer salt solution and a mass of PTEO or the second polymer salt solution, in a non-limiting example an equal mass of each, may be dissolved in dimethyl carbonate to yield a system that is 50% of each polymer, by weight. Afterwards, a desirable amount of component (C), in the non-limiting example $LiPF_6$, may be added to create the salt-containing polymer blend solution. Alternatively, no additional salt of component (C) may be added. The solution may be deposited into a silicon mold. The solution may be kept in a vacuum for a time period, for example, for 12 hours, until all solvent is removed.

EXAMPLES

Ionic Conductivity

Examples 1-12—PTEO Films and PPEGMA Films

To study ionic conductivity of the components (A) and (B), the polymer (A) solution and polymer (B) solution were tested with different amounts of the salt component (C). Examples 1-6 were prepared by synthesis of PTEO according to the method described above to form a PTEO solution to which different amounts of salt, $LiPF_6$, were added. Examples 1-6 differed in the amount of salt added to PTEO to create PTEO-$LiPF_6$ complex systems with varying [$Li^+$]:[O] ratios. Examples 7-12 were prepared by synthesis of PPEGMA according to the method described above to form a PPEGMA solution to which different amounts of salt, $LiPF_6$, were added. Examples 7-12 differed in the amount of salt added to PPEGMA to create PPEGMA-$LiPF_6$ complex systems with varying [$Li^+$]:[O] ratios. The [$Li^+$]:[O] ratios for Examples 1-12 are shown in Table 1 below.

TABLE 1

[$Li^+$]:[O] ratios and type of polymer for Examples 1-12

| Example No. | 1 | 2 | 3 | 4 | 5 | 6 | 7 | 8 | 9 | 10 | 11 | 12 |
|---|---|---|---|---|---|---|---|---|---|---|---|---|
| Polymer | PTEO | | | | | | PPEGMA | | | | | |
| [$Li^+$]:[O] ratio | 0.00 | 0.03 | 0.05 | 0.08 | 0.11 | 0.13 | 0.00 | 0.03 | 0.05 | 0.08 | 0.11 | 0.13 |

Figure 4:
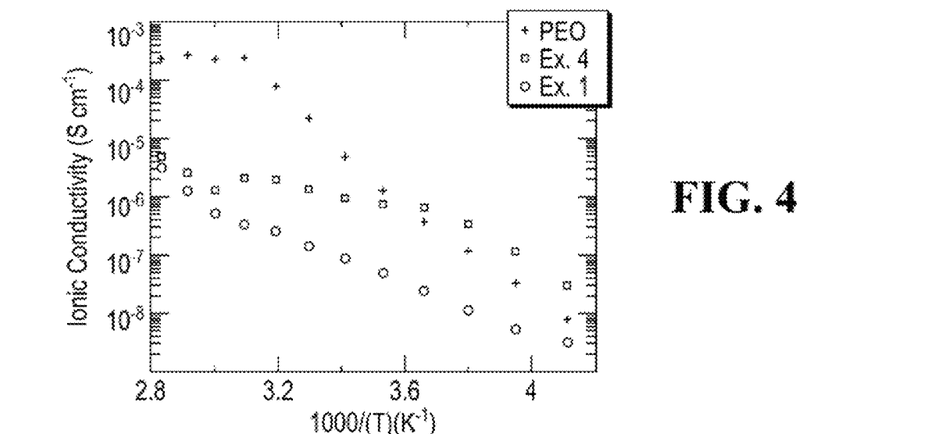
FIG. 4 is a plot of ionic conductivity versus temperature of Examples 1 and 4 in comparison to a PEO sample, measured using AC impedance spectroscopy in a range of $10^{-2}$ Hz to $10^7$ Hz and across a temperature range of $-30°$ C. to $80°$ C.

The ionic conductivity of Examples 1-6 was measured using AC impedance spectroscopy in a range of $10^{-2}$ Hz to $10^7$ Hz and across a temperature range of −30° C. to 80° C. To eliminate any effects associated with the electronic conductivity of the PTEO domains, PPEGMA electron blocking layers were placed between the electrodes and Examples 1-6. The PPEGMA blocking layers contained the same [$Li^+$]:[O] ratio as the respective Examples 1-6. Example 1, with neat PPEGMA electron-blocking layers, displayed a room-temperature ionic conductivity of $10^{-7}$ S/cm. With the addition of $LiPF_6$ at a [$Li^+$]:[O] ratio of 0.08 (Example 4), the room temperature ionic conductivity increased by an order of magnitude to $10^{-6}$ S/cm due to coordination with lithium ions, as can be observed in FIG. 4. FIG. 4 also shows a Comparative Example of PEO within the temperature range of −30° C. to 80° C.

Figure 5:
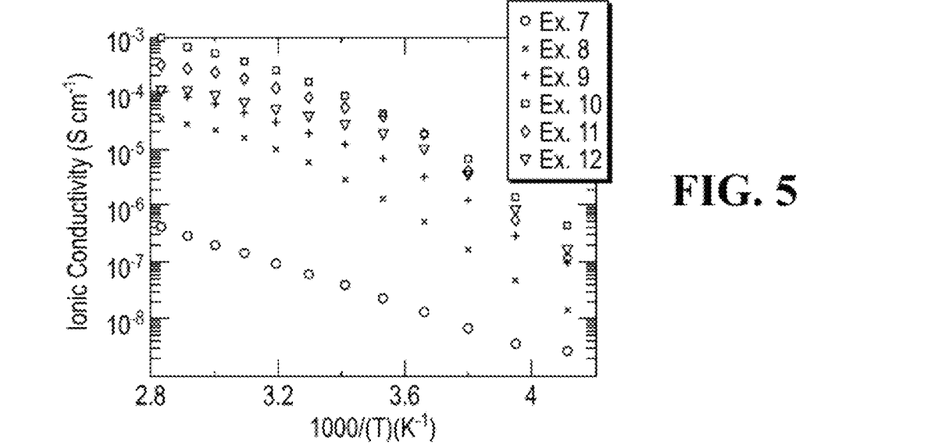
FIG. 5 is a plot of ionic conductivity versus temperature of Examples 7-12, measured using AC impedance spectroscopy in a range of $10^{-2}$ Hz to $10^7$ Hz and across a temperature range of $-30°$ C. to $80°$ C.
Figure 6:
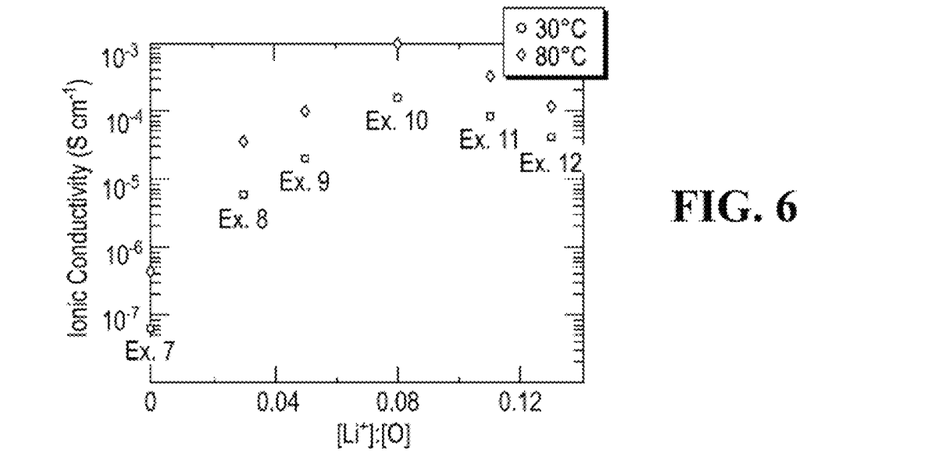
FIG. 6 is a plot of ionic conductivity versus [Li$^+$]:[O] ratio for Examples 7-12, measured using AC impedance spectroscopy in a range of $10^{-2}$ Hz to $10^7$ Hz and across a temperature range of $-30°$ C. to $80°$ C.

The ionic conductivity of Examples 7-12 was measured using AC impedance spectroscopy in a range of $10^{-2}$ Hz to $10^7$ Hz and across a temperature range of −30° C. to 80° C. The results can be seen in FIGS. 5 and 6. As can be seen in FIG. 6, the ionic conductivity initially increased at higher [$Li^+$]:[O] ratios as a direct result of the coordination between the EO side chains and lithium ions. Example 10 with the [$Li^+$]:[O] ratio of 0.08 had a room temperature ionic conductivity of ~$10^{-4}$ S/cm. But beyond a [$Li^+$]:[O] ratio of 0.08, the ionic conductivity decreased. Without limiting the disclosure to a single theory, it is believed that the decrease was due to slower chain motion. As more lithium ions were introduced into the polymer-salt complex, the segmental motion of the polymer chains decreased due to interference from the bulky counterions present and the subsequently increased $T_g$ of the salt-PPEGMA composite. Overall, PPEGMA demonstrated relatively high ionic conductivity values and a very good potential for inclusion in mixed conducting.

Examples 13-18—Polymer Blend Films

Six blends, each blend including an equal mass of PPEGMA-($LiPF_6$) salt complex and PTEO were prepared as Examples 13-18, according to the method of preparing the polymer blend films described above. Each one of the Examples 13-18 had 50 wt. % of PPEGMA-($LiPF_6$) complex and 50 wt. % PTEO. Examples 13-18 differed in the amount of salt added to PPEGMA to create polymer blends with varying [$Li^+$]:[O] ratios. The ratios are listed in Table 2 below.

TABLE 2

[$Li^+$]:[O] ratios in PPEGMA-LiPF6 complexes of Examples 13-18

| Example No. | 13 | 14 | 15 | 16 | 17 | 18 |
|---|---|---|---|---|---|---|
| [$Li^+$]:[O] ratio | 0 | 0.03 | 0.05 | 0.08 | 0.11 | 0.13 |

Figures 7, 8:
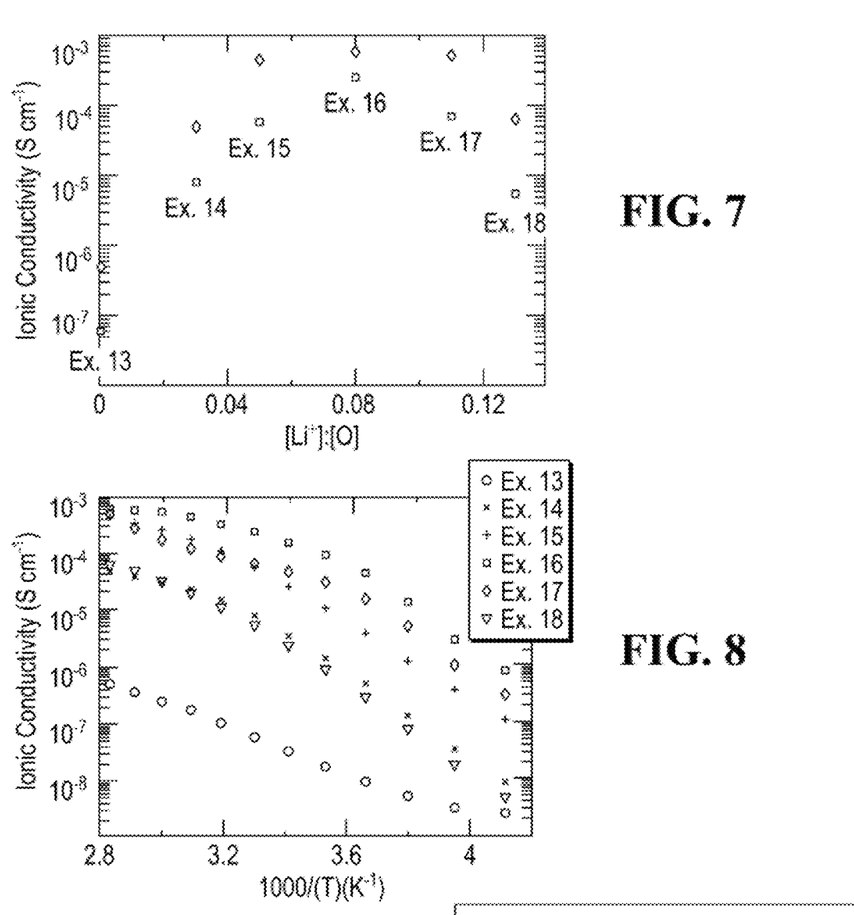
FIG. 7 is a plot of ionic conductivity versus [Li$^+$]:[O] ratio for Examples 13-18, measured using AC impedance spectroscopy in a range of $10^{-2}$ Hz to $10^7$ Hz and across a temperature range of $-30°$ C. to $80°$ C.
FIG. 8 is a plot of ionic conductivity versus temperature of Examples 13-18, measured using AC impedance spectroscopy in a range of $10^{-2}$ Hz to $10^7$ Hz and across a temperature range of $-30°$ C. to $80°$ C.

The ionic conductivity of Examples 13-18 was measured using AC impedance spectroscopy in a range of $10^{-2}$ Hz to $10^7$ Hz and across a temperature range of −30° C. to 80° C. Results are shown in FIGS. 7 and 8. The ionic conductivity increased at higher [Li$^+$]:[O] ratios, and decreased at [Li$^+$]: [O] ratios greater than 0.08, almost in the same way as in Examples 7-12. But beyond a [Li$^+$]:[O] ratio of 0.08, the ionic conductivity decreased due to slower chain motion. Similar to pure PPEGMA-salt complex, at a [Li$^+$]:[O] ratio of 0.08, the polymer blend film of Example 16 reached its maximum conductivity of 10$^{-4}$ S/cm.

Electronic Conductivity

Examples 1-6 and 13-18

Figure 9:
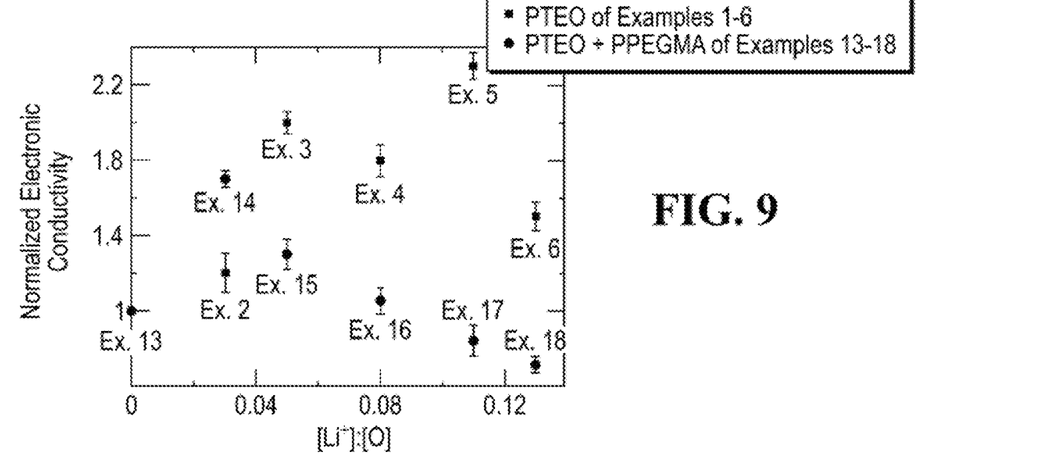
FIG. 9 is a plot of normalized DC electronic conductivity versus [Li$^+$]:[O] ratio for Examples 1-6 and 13-18, measured using AC impedance spectroscopy in a range of $10^{-2}$ Hz to $10^7$ Hz and across a temperature range of $-30°$ C. to $80°$ C.

The normalized DC electronic conductivity of Examples 1-6 and 13-18 was measured. The results are shown in FIG. 9. The lithium ions doped the electronic conductivity of the thin films increasing the conductivity by 2.3 times in PTEO Examples and 1.7 times in the PTEO+PPEGMA blend Examples. Despite an initial increase, the electronic conductivity decreased at higher salt loadings in the blend due to poor film quality. Ideally, the more salt added would increase the number of cation sites and subsequently increase the electronic conductivity of the film. While that occurs, as more salt was added to the films, the film quality decreased as small molecules have demonstrated film formation issues when solution-processed. The poor film quality caused defects within the film, interfering with the charge transport redox reactions necessary for high electronic conductivity.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A battery electrode material comprising:
a composition of (A) a charge-conducting radical polymer, (B) poly[poly(ethylene oxide) methyl ether methacrylate] (PPEGMA), and (C) a lithium salt, the composition being a mixed ionic and electronic conductor with ionic conductivity at room temperature of at least about 10$^{-4}$ S/cm and electronic conductivity of at least about 10$^{-3}$ S/cm.

2. The battery electrode material of claim 1, wherein the charge-conducting radical polymer is poly(4-glycidyloxy-2, 2,6,6-tetramethylpiperidine-1-oxyl (PTEO).

3. The battery electrode material of claim 1, wherein a ratio of [Li$^+$]:[O] in the composition is about 0.2 to 0.9.

4. The battery electrode material of claim 1, wherein a mass ratio of (A):(B) is from about 1:1 to about 1:4.

5. The battery electrode material of claim 1, wherein (A) forms a matrix supporting a plurality of islands including (B) and (C).

6. The battery electrode material of claim 1, wherein the composition is included in a solid state battery.

7. The battery electrode material of claim 1, wherein the composition forms a cathode.

8. An electron- and ion-conducting material comprising:
a matrix including (A) an electron charge-conducting radical polymer; and
a plurality of islands embedded in the matrix, the plurality of islands including (B) a lithium ion-conducting polymer and (C) one or more salts, the matrix and plurality of islands being a mixed electronic and ionic conductor with ionic conductivity at room temperature of at least about 10$^{-4}$ S/cm and electronic conductivity of at least about 10$^{-3}$ S/cm, the (A) electron charge-conducting radical polymer being poly(4-glycidyloxy-2,2,6,6-tetramethylpiperidine-1-oxyl (PTEO).

9. The material of claim 8, wherein a mass ratio of (A):(B) is from about 1:1 to about 1:4.

10. The material of claim 8, wherein the lithium ion-conducting polymer is poly[poly(ethylene oxide) methyl ether methacrylate] (PPEGMA), poly(ethylene oxide) (PEO), or both.

11. The material of claim 8, wherein a ratio of [Li$^+$]:[O] in the conductor is about 0.1 to 0.12.

12. The material of claim 8, wherein (C) is a mixture of lithium salts.

13. The material of claim 8, wherein (A) and (B) are bound by covalent bonds.

14. A sensor comprising the material of claim 8.

15. An electronic device comprising the material of claim 8.

16. A method of forming an ion-and-electron conductive material, comprising:
direct blending individually synthesized component (A) including an electron charge-conducting radical polymer with a mixture of component (B) including a lithium ion-conducting polymer and component (C) including a lithium salt to form a polymer blend solution having a [Li$^+$]:[O] ratio of about 0.1 to 0.12; and
casting and drying the polymer blend solution to form the ion-and-electron conductive material such that a matrix of the component (A) supports a plurality of islands of the components (B) and (C),
the component (A) comprising poly(4-glycidyloxy-2,2,6, 6-tetramethylpiperidine-1-oxyl (PTEO).

17. The method of claim 16, further comprising forming a thin film from the ion-and-electron conductive material having a thickness of about 50 nm to 5 μm.

18. The method of claim 16, wherein the component (B) comprises poly[poly(ethylene oxide) methyl ether methacrylate] (PPEGMA), poly(ethylene oxide) (PEO), or both.

* * * * *